United States Patent
Harada (10) Patent No.: US 12,152,370 B2
(45) Date of Patent: Nov. 26, 2024

(54) WORKING VEHICLE

(71) Applicant: Yanmar Power Technology Co., Ltd., Osaka (JP)

(72) Inventor: Takahiro Harada, Chikugo (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 726 days.

(21) Appl. No.: 17/252,653

(22) PCT Filed: Jun. 4, 2019

(86) PCT No.: PCT/JP2019/022122
§ 371 (c)(1),
(2) Date: Dec. 15, 2020

(87) PCT Pub. No.: WO2019/244618
PCT Pub. Date: Dec. 26, 2019

(65) Prior Publication Data
US 2021/0262193 A1      Aug. 26, 2021

(30) Foreign Application Priority Data
Jun. 22, 2018   (JP) .................................. 2018-118678

(51) Int. Cl.
*E02F 9/02* (2006.01)
*E02F 9/08* (2006.01)

(52) U.S. Cl.
CPC ............ *E02F 9/024* (2013.01); *E02F 9/0808* (2013.01)

(58) Field of Classification Search
CPC .................................................... E02F 9/0808
See application file for complete search history.

(56) References Cited

FOREIGN PATENT DOCUMENTS

| JP | 2003019986 A | * | 1/2003 |
| JP | 2011074605 A | * | 4/2011 |
| JP | 2012031598 A | * | 2/2012 |
| JP | 2013-129997 A |  | 7/2013 |
| JP | 2014202009 A | * | 10/2014 |

OTHER PUBLICATIONS

International Search Report dated Jul. 16, 2019 issued in corresponding PCT Application PCT/JP2019/022122.
European Search report dated Feb. 18, 2022 issued in EP Application No. 19823498.1.

\* cited by examiner

*Primary Examiner* — Jacob D Knutson
(74) *Attorney, Agent, or Firm* — NORTON ROSE FULBRIGHT US LLP (57) ABSTRACT

A working vehicle has an upper rotating body and a lower traveling body. The lower traveling body is provided with: a center frame on which a swivel joint is vertically mounted; a right side frame on which a right traveling motor is mounted; a left side frame on which a left traveling motor is mounted; at least one right restriction member and at least one left restriction member, which restrict the maximum width of the vehicle; a right hose guide section having a right opening into which a right hydraulic hose is inserted, and provided to the right restriction member; and a left hose guide section having a left opening into which a left hydraulic hose is inserted, and provided to the left restriction member.

19 Claims, 6 Drawing Sheets

WORKING VEHICLE

CROSS REFERENCES TO RELATED APPLICATIONS

This application is a national stage application pursuant to 35 U.S.C. § 371 of International Application No. PCT/JP2019/022122, filed on Jun. 4, 2019 which claims priority under 35 U.S.C. § 119 to Japanese Patent Application No. 2018-118678 filed on Jun. 22, 2018, the disclosures of which are hereby incorporated by reference in their entireties.

TECHNICAL FIELD

The present invention relates to a working vehicle, for example, a crawler type traveling working vehicle whose width can be changed.

BACKGROUND ART

Patent Literature 1 discloses a hydraulic hose piping structure of a mini shovel including a lower traveling body provided with left and right side frames that capable of changing the vehicle width. The hydraulic hose piping structure includes first and second restraining members that restrain first and second hydraulic hose groups connected between a center joint to left and right traveling devices, respectively, so that the hose groups are not dispersed.

Patent Literature 2 discloses a hydraulic hose piping structure for a construction machine including a lower traveling body provided with left and right side frames capable of changing the vehicle width. In the hydraulic hose piping structure, first and second hydraulic hose groups connected between a center joint and left and right traveling devices, respectively, are bent along the outer circumferential surface of the center joint. The first and second hydraulic hose groups are expanded or contracted in a space formed between the outer circumferential surface of the center joint and the inner circumferential surface of a round body disposed inside the center joint. In this way, the vehicle width can be changed without forcibly bending the first and second hydraulic hose groups.

CITATION LIST

Patent Literature

PTL 1: Japanese Unexamined Patent Publication No. 2014-202009
PTL 2: Japanese Unexamined Patent Publication No. 2013-129997

DISCLOSURE OF INVENTION

Problems to be Solved by the Invention

However, in the hydraulic hose piping structure of Patent Literature 1, when the width between the left and right side frames is contracted, the first and second hydraulic hoses enter a bent state and protrude from the lower traveling body. This leads to a concern in that the hydraulic hoses may be damaged due to contact with falling objects or obstacles.

In the hydraulic hose piping structure of Patent Literature 2, the hydraulic hoses are bent and wrapped around the outer circumferential surface of the center joint. As a result, the total length of the hydraulic hoses increases. This leads to an increase in cost.

An object of the present invention, which has been made in view of the above-described issues, is to provide a working vehicle having a hydraulic hose piping structure that allows hydraulic hoses to be designed with the minimum necessary length and is capable of restricting the free movement of the hydraulic hoses without forcibly bending the hydraulic hoses.

Means for Solving the Problems

The working vehicle according to the present invention includes an upper rotating body and a lower traveling body that rotatably supports the upper rotating body. The lower traveling body includes a center frame on which a swivel joint is vertically disposed, one end of a right hydraulic hose and one end of a left hydraulic hose being connected to the swivel joint; a right side frame and a left side frame symmetrically disposed on sides of the center frame, a right traveling motor being mounted on the right side frame, the other end of the right hydraulic hose being connected to the right traveling motor, a left traveling motor being mounted on the left side frame, the other end of the left hydraulic hose being connected to the left traveling motor; at least one right restriction member and at least one left restriction member restricting a gap between the right side frame and the left side frame to be a maximum vehicle width, the right restriction member extending from the right side frame toward the left side frame, the left restriction member extending from the left side frame toward the right side frame; a right hose guide portion disposed on the right restriction member and having a right opening through which the right hydraulic hose is passed; and a left hose guide portion disposed on the left restriction member and having a left opening through which the left hydraulic hose is passed.

The lower traveling body may include a rear lateral support frame disposed on a rear upper surface of the center frame behind the swivel joint; a rear right coupling portion that extends from the right side frame toward the left side frame and is slidably inserted to the right side of the rear lateral support frame; a rear left coupling portion that faces the rear right coupling portion, extends from the left side frame toward the right side frame, and is slidably inserted to the left side of the rear lateral support frame; a front lateral support frame disposed on a front upper surface of the center frame such that the front lateral support frame faces the rear lateral support frame with the swivel joint in between; and a front right coupling portion that extends from the right side frame toward the left side frame and is slidably inserted to the right side of the front lateral support frame; and a front left coupling portion that faces the front right coupling portion, extends from the left side frame toward the right side frame, and is slidably inserted to the left side of the front lateral support frame.

The lower traveling body may include a hose path portion having a space on an upper face of the center frame and the space guiding the right and left hydraulic hoses from the swivel joint to the right and left hydraulic motors.

The hose path portion may further include a right rear guide portion having a right rear opening and/or a left rear guide portion a left rear opening, the right rear opening being disposed closer to the right hydraulic motor than the right hose guide portion, the right hydraulic hose being passed through the right rear opening, the left rear opening being disposed closer to the left hydraulic motor than the left hose guide portion, the left hydraulic hose being passed through the left rear opening.

The hose path portion may further include a right front guide portion and/or a left front guide portion, the right front guide portion having a right front opening disposed closer to the swivel joint than the right hose guide portion, the right hydraulic hose being passed through the right front opening, the left front guide portion having a left front opening disposed closer to the swivel joint than the left hose guide portion, the left hydraulic hose being passed through the left front opening.

Effect of the Invention

According to the present invention, the hydraulic hoses can be designed to have a minimum required length.

According to the present invention, it is possible to restrict the free movement of the hydraulic hoses without forcibly bending the hydraulic hoses.

DESCRIPTION OF EMBODIMENTS

Embodiments of the present invention will now be described with reference to the drawings. A backhoe will be described as an example of a working vehicle of the present embodiment. However, the working vehicle is not limited to a backhoe, and may be any other vehicle, such as a wheel loader. Note that, in the drawings, the vehicle traveling direction is denoted by "front" and "rear," the vehicle width direction is denoted by "left" and "right," and the vehicle height direction is denoted by "top" and "bottom." When indicating placement, "front" refers to the front in the forward direction, and "rear" refers to the rear in the forward direction. "Right" refers to the right in the width direction of the vehicle when facing the "front," and "left" refers to the left in the width direction of the vehicle when facing the "front."

Figure 1:
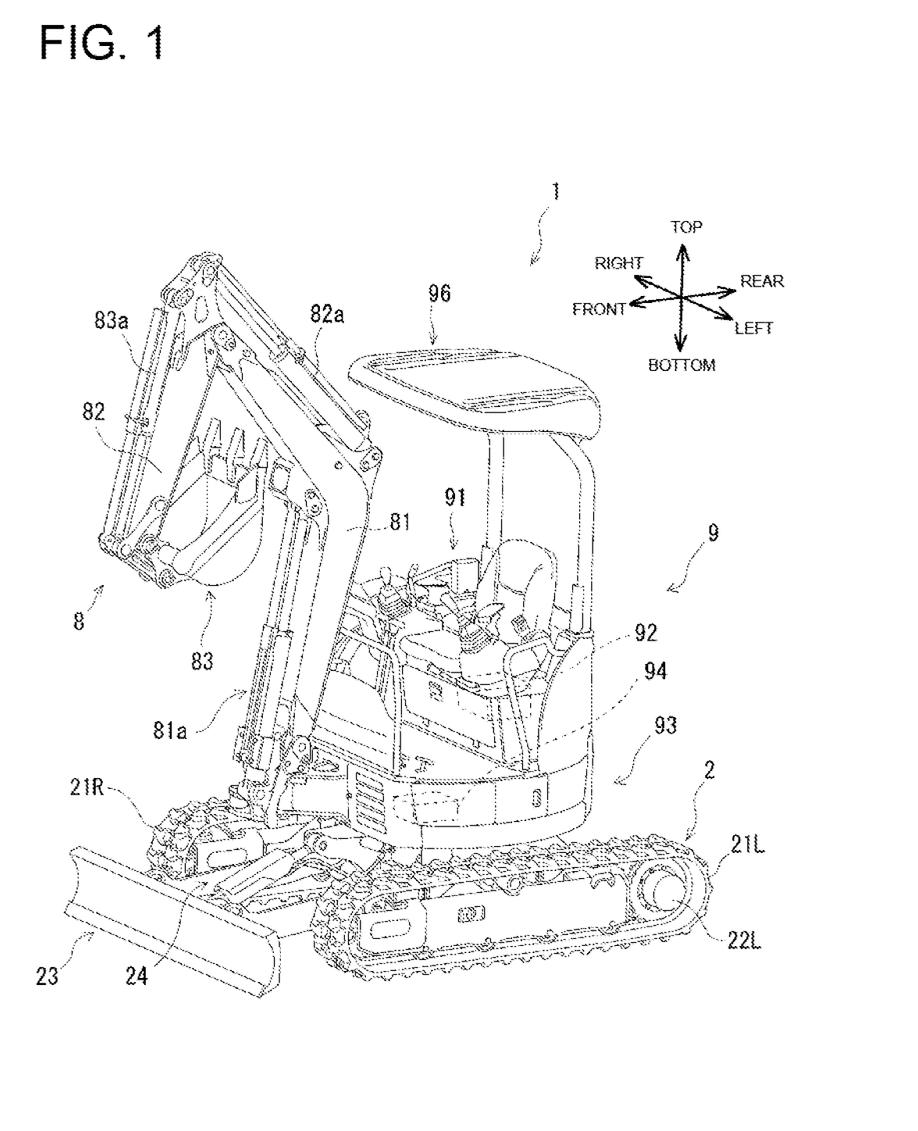
FIG. 1 is a left side perspective view of a working vehicle according to an embodiment.

FIG. 1 is a left side perspective view of a backhoe 1 and illustrates the schematic configuration of the backhoe 1. The backhoe 1 includes a lower traveling body 2, a working machine 8, and an upper rotating body 9.

The lower traveling body 2 is driven by the power from an engine 92 mounted on the upper rotating body 9, to drive the backhoe 1. The lower traveling body 2 includes right and left crawlers 21R and 21L and paired right and left traveling motors 22R and 22L. The right and left traveling motors 22R and 22L, which are hydraulic motors, drive the right and left crawlers 21R and 21L, respectively, to enable the backhoe 1 to move forward and backward. The lower traveling body 2 is provided with a blade 23 in the forward direction and a blade cylinder 24 that is a hydraulic actuator for turning the blade 23 in the vertical direction.

The working machine 8 is driven by the power from the engine 92 and performs excavation work of the land, etc. The working machine 8 includes a boom 81, an arm 82, and a bucket 83. The working machine 8 capable of excavation work by driving these components independently.

The proximal end of the boom 81 is rotatably supported in the vertical direction by the front portion of the upper rotating body 9. The boom 81 is turned by a boom cylinder 81a that can be expanded and contracted. The proximal end of the arm 82 is supported by the end portion of the boom 81. The arm 82 is turned by an arm cylinder 82a that can be expanded and contracted. The proximal end of the bucket 83 is supported by the end portion of the arm 82. The bucket 83 is turned by a bucket cylinder 83a that can be expanded and contracted. The boom cylinder 81a, the arm cylinder 82a, and the bucket cylinder 83a correspond to hydraulic actuators that drive a working unit. The boom 81 and the arm 82 form an articulated structure. The boom 81 is disposed on the most proximal side among the elements constituting the articulated structure.

The upper rotating body 9 includes a steering unit 91, an engine 92, a rotating base 93, a rotation motor 94, a canopy 96, etc. The rotation motor 94, which is a hydraulic motor, turns the upper rotating body 9 by driving the rotating base 93. Multiple hydraulic pumps (not illustrated in FIG. 1) driven by the engine 92 are disposed on the upper rotating body 9. The hydraulic pumps supply hydraulic oil to the boom cylinder 81a, the arm cylinder 82a, and the bucket cylinder 83a. The hydraulic pump supplies hydraulic oil to a swivel joint 25 of the lower traveling body 2, to drive the blade cylinder 24, the right traveling motor 22R, and the left traveling motor 22L, which are connected by the swivel joint 25 and hydraulic hoses (front hydraulic hoses 253, right hydraulic hoses 251R, and left hydraulic hoses 251L).

[Basic Configuration of Lower Traveling Body 2]

Figure 2A:
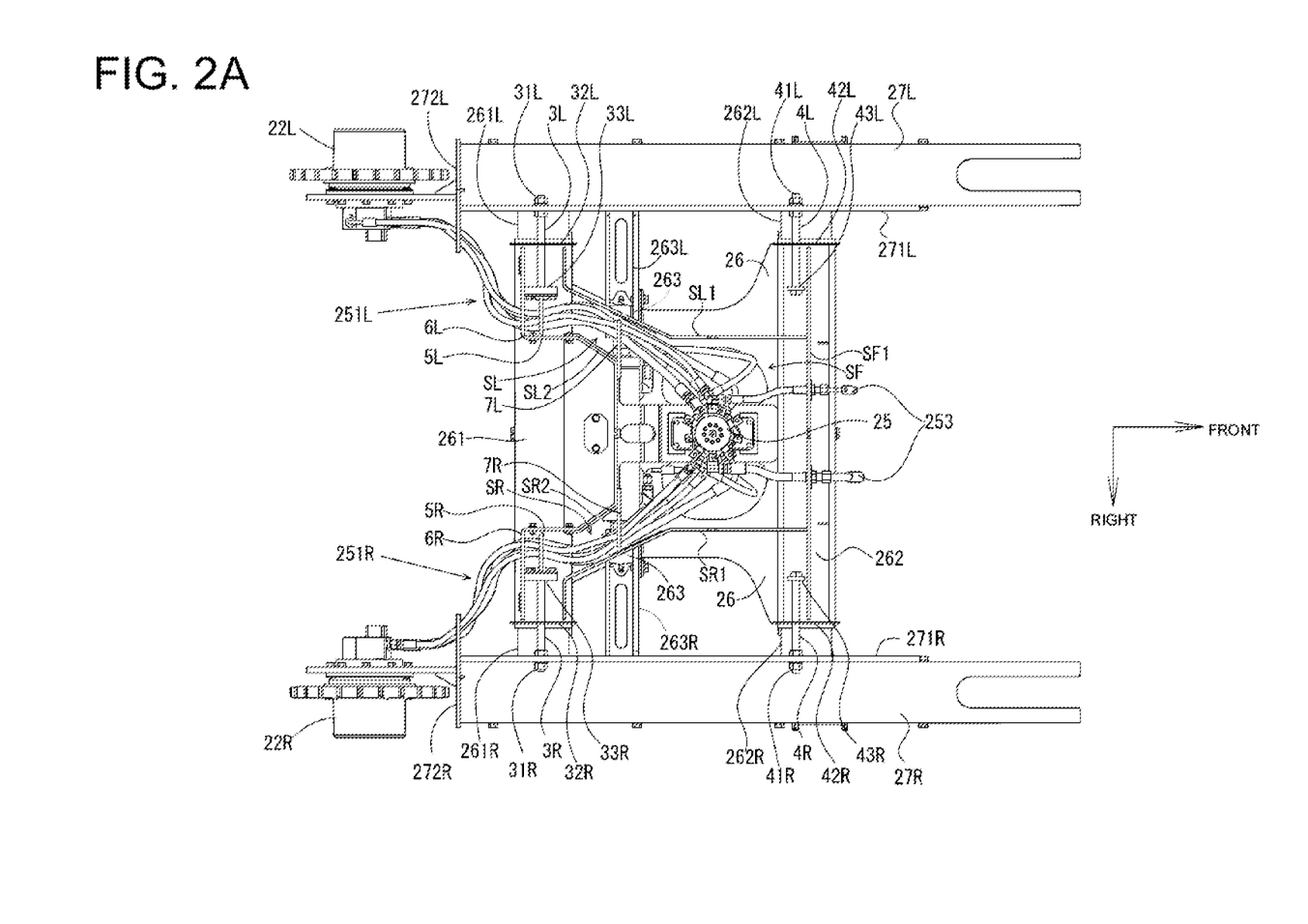
FIG. 2A is a plan view of a hydraulic hose piping structure in which the vehicle width is a minimum width.
Figure 2B:
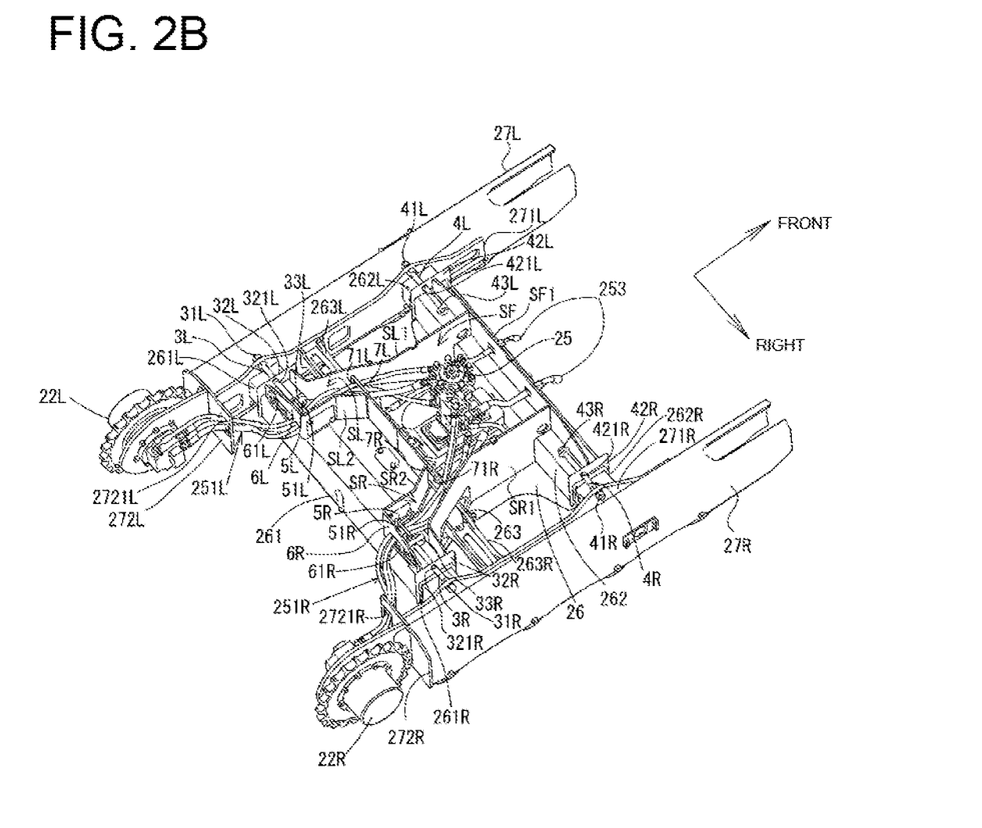
FIG. 2B is a perspective view of a hydraulic hose piping structure in which the vehicle width is a minimum width.
Figure 3A:
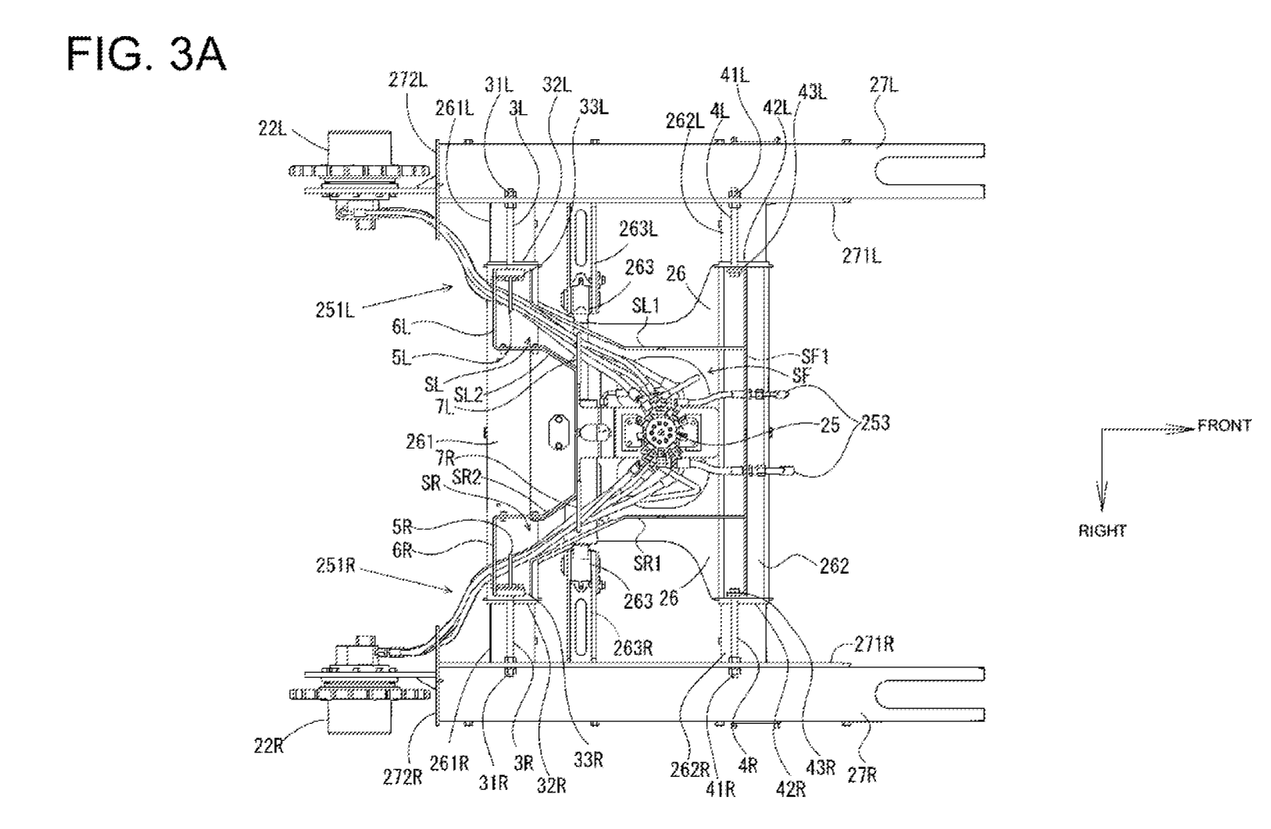
FIG. 3A is a plan view of a hydraulic hose piping structure in which the vehicle width is a maximum width.
Figure 3B:
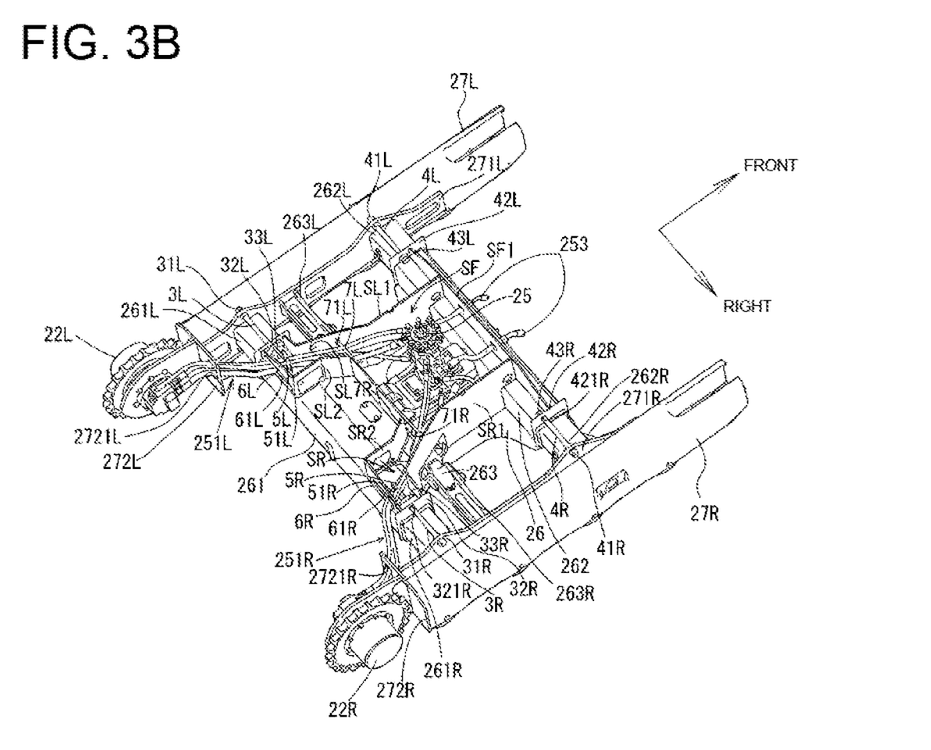
FIG. 3B is a perspective view of a hydraulic hose piping structure in which the vehicle width is a maximum width.
Figure 3C:
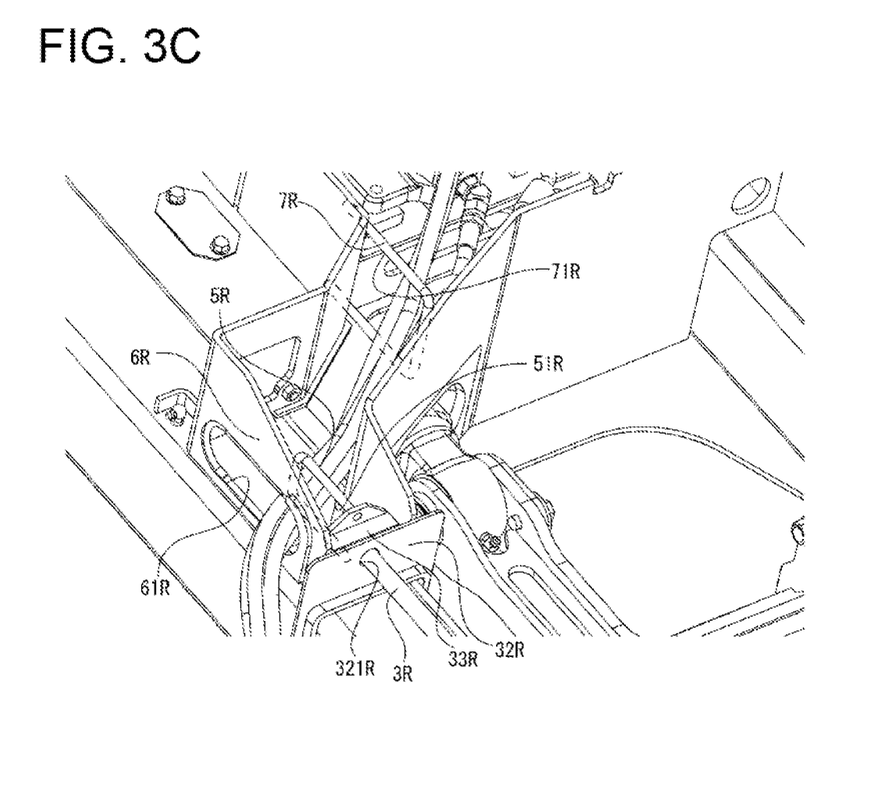
FIG. 3C is a partially enlarged view of a hydraulic hose piping structure according to FIG. 3B.

FIGS. 2A and 2B illustrate the hydraulic hose piping structure when the vehicle width is a minimum width. FIGS. 3A and 3B illustrate the hydraulic hose piping structure when the vehicle width is a maximum width. FIG. 3C is an enlarged view of a portion of the hydraulic hose piping structure when the vehicle width is a maximum width. The basic configuration of the lower traveling body 2 will be described with reference to the drawings.

The swivel joint 25 is suspended at a position at the center in the width direction toward the front from a center frame 26 disposed at the center of the lower traveling body 2.

The swivel joint 25 has hydraulic lines therein, and has multiple inlet joints for receiving hydraulic oil from the multiple hydraulic pumps driven by the engine 92. The swivel joint 25 has multiple outlet joints for supplying the hydraulic oil to the right traveling motor 22R and the left traveling motor 22L. One of the ends of the right hydraulic hoses 251R and one of the ends of the left hydraulic hoses 251L are connected to the outlet joints.

A right side frame 27R and a left side frame 27L are arranged symmetrically on the right and left sides of the center frame 26. The right traveling motor 22R to which the other ends of the right hydraulic hoses 251R are connected is mounted on the right side frame 27R at a rear position. The left traveling motor 22L to which the other ends of the left hydraulic hoses 251L are connected is mounted on the left side frame 27L at a rear position.

A rear lateral support frame 261 is welded to the rear upper surface of the center frame 26 behind the swivel joint 25.

A rear right coupling portion 261R extends from the right side frame 27R toward the left side frame 27L, and is slidably inserted to the right side of the internal space of the rear lateral support frame 261.

The rear left coupling portion 261L is disposed so as to face the rear right coupling portion 261R with a gap therebetween, extends from the left side frame 27L toward the right side frame 27R, and is slidably inserted to the left side of the internal space of the rear lateral support frame 261.

A front lateral support frame 262 is welded to the front upper surface of the center frame 26 so as to face the rear lateral support frame 261 with the swivel joint 25 in between.

A front right coupling portion 262R extends from the right side frame 27R toward the left side frame 27L, and is slidably inserted to the right side of the internal space of the front lateral support frame 262.

A front left coupling portion 262L is disposed so as to face the front right coupling portion 262R with a gap therebetween, extends from the left side frame 27L toward the right side frame 27R, and is slidably inserted to the left side of the internal space of the front lateral support frame 262.

A hydraulic cylinder 263 for expansion and contraction is disposed parallel to the width direction on the center frame 26 in front of the rear lateral support frame 261. A right link portion 263R of the hydraulic cylinder 263 is welded to the right side frame 27R, and a left link portion 263L of the hydraulic cylinder 263 is welded to the left side frame 27L.

[Restriction Member]

A rear right restriction member 3R has a rod shape. A fixed end 31R of the rear right restriction member 3R is fixed to a right vertical portion 271R erected from the inner surface of the right side frame 27R by a fixing means, is slidably inserted to a through-hole 321R in a rear right limiting portion 32R erected on the rear lateral support frame 261 closer to the right side frame 27R than the center, and protrudes toward the left side frame 27L. The end of the rear right restriction member 3R adjacent to the left side frame 27L has a stopper 33R having a diameter larger than that of the through-hole 321R.

A rear left restriction member 3L has a rod shape. A fixed end 31L of the rear left restriction member 3L is fixed to a left vertical portion 271L erected from the inner surface of the left side frame 27L by a fixing means, is slidably inserted to a through-hole 321L in a rear left limiting portion 32L erected on the rear lateral support frame 261 closer to the left side frame 27L than the center, and protrudes toward the right side frame 27R. The end of the rear left restriction member 3L adjacent to the right side frame 27R has a stopper 33L having a diameter larger than that of the through-hole 321L.

A front right restriction member 4R has a rod shape. A fixed end 41R of the front right restriction member 4R is fixed to a right vertical portion 271R erected from the inner surface of the right side frame 27R by a fixing means, is slidably inserted to a through-hole 421R in a front right limiting portion 42R erected on the front lateral support frame 262 closer to the right side frame 27R than the center, and protrudes toward the left side frame 27L. The end of the front right restriction member 4R adjacent to the left side frame 27L has a stopper 43R having a diameter larger than that of the through-hole 421R.

A front left restriction member 4L has a rod shape. A fixed end 41L of the front left restriction member 4L is fixed to a left vertical portion 271L erected from the inner surface of the left side frame 27L by a fixing means, is slidably inserted to a through-hole 421L in a front left limiting portion 42L erected on the front lateral support frame 262 closer to the left side frame 27L than the center, and protrudes toward the right side frame 27R. The end of the front left restriction member 4L adjacent to the right side frame 27R has a stopper 43L having a diameter larger than that of the through-hole 421L.

The maximum vehicle width at which the gap between the right side frame 27R and the left side frame 27L is a maximum length is restricted by the stopper 33R of the rear right restriction member 3R and the rear right limiting portion 32R abutting the stopper 33R, the stopper 33L of the rear left restriction member 3L and the rear left limiting portion 32L abutting the stopper 33L, the stopper 43R of the front right restriction member 4R and the front right limiting portion 42R abutting the stopper 43R, and the stopper 43L of the front left restriction member 4L and the front left limiting portion 42L abutting the stopper 43L.

The minimum vehicle width is restricted by setting the length of the hydraulic cylinder 263 for expansion and contraction to a minimum length.

[Hydraulic Hose Piping Structure]

The multiple right hydraulic hoses 251R are connected to the joints on the swivel joint 25 closer to the right side frame 27R than the left side frame 27L. The multiple left hydraulic hoses 251L are connected to the joints on the swivel joint 25 closer to the left side frame 27L than the right side frame 27R. By being arranged in this way, the hoses do not have to be longer than necessary and do not bend inside the hose path portion described below.

A right hose guide portion 5R extends from the end of the stopper 33R of the rear right restriction member 3R and moves in the left-right direction as the rear right restriction member 3R following the right side frame 27R moves to expand/contract the vehicle width. The right hose guide portion 5R has a right opening 51R through which the multiple right hydraulic hoses 251R are passed (see the enlarged view of FIG. 3C).

The right opening 51R of the right hose guide portion 5R opens in the front-rear direction of the vehicle above the rear lateral support frame 261.

A left hose guide portion 5L extends from the end of the stopper 33L of the rear left restriction member 3L and moves in the left-right direction as the rear left restriction member 3L following the left side frame 27L move to expand/contract the vehicle width. The left hose guide portion 5L has a left opening 51L through which the multiple left hydraulic hoses 251L are passed.

The left opening 51L of the left hose guide portion 5L opens in the front-rear direction of the vehicle above the rear lateral support frame 261. In the present embodiment, the right and left hose guide portions 5R and 5L each have a rectangular ring shape, and the inside of each ring forms an opening.

The hose path portion is defined by a substantially rectangular shape centered on the swivel joint 25, and extends to the destination point of the hydraulic hoses along a short distance, preferably the shortest distance.

The hose path portion has a front path space SF on the upper surface of the center frame 26 for guiding the front hydraulic hoses 253 from the swivel joint 25 to the blade cylinder 24.

The front path space SF has a front vertical portion SF1 erected along the width direction parallel to the front lateral support frame 262 in front of the swivel joint 25. The multiple front hydraulic hoses 253 are passed through the through-holes formed in the front vertical portion SF1.

The hose path portion has, on the upper surface of the center frame 26, a right path space SR for guiding the right hydraulic hoses 251R from the swivel joint 25 to the right hydraulic motor 22R, and a left path space SL for guiding the left hydraulic hoses 251L from the swivel joint 25 to the left hydraulic motor 22L.

The right path space SR has a first right vertical portion SR1 and a second right vertical portion SR2. The first right vertical portion SR1 extends diagonally from the right side of the swivel joint 25 in the rear right direction to the rear lateral support frame 261, crosses the rear lateral support frame 261, and farther extends to the right side frame 27R. The second right vertical portion SR2 extends along the shape of the first right vertical portion SR1 with a space formed therebetween. The right hydraulic hoses 251R pass through the space.

The second right vertical portion SR2 includes a right rear guide portion 6R having a right rear opening 61R through which the right hydraulic hoses 251R are passed. The right rear opening 61R is formed in the right rear guide portion 6R at a position closer to the right hydraulic motor 22R than the right hose guide portion 5R (see the enlarged view of FIG. 3C).

The right rear opening 61R opens in the front-rear direction of the vehicle above the rear lateral support frame 261.

The second right vertical portion SR2 includes a right front guide portion 7R having a right front opening 71R through which the right hydraulic hoses 251R are passed. The right front opening 71R is formed in the right front guide portion 7R at a position closer to the swivel joint 25 than the right hose guide portion 5R (see the enlarged view of FIG. 3C).

The right front opening 71R opens in the front-rear direction of the vehicle above the center frame 26.

In the present embodiment, the right front opening 71R has a U-shape, and the inside of the U-shape forms an opening.

The left path space SL has a first left vertical portion SL1 and a second left vertical portion SL2. The first left vertical portion SL1 extends diagonally from the left side of the swivel joint 25 to the rear lateral support frame 261 in the rear left direction, crosses the rear lateral support frame 261, and farther extends to the left side frame 27L. The second left vertical portion SL2 extends along the shape of the first left vertical portion SL1 with a space formed therebetween. The left hydraulic hoses 251L pass through the space.

The second left vertical portion SL2 includes a left rear guide portion 6L having a left rear opening 61L through which the left hydraulic hoses 251L are passed. The left rear opening 61L is formed in the left rear guide portion 6L at a position closer to the left hydraulic motor 22L than the left hose guide portion 5L.

The left rear opening 61L opens in the front-rear direction of the vehicle above the rear lateral support frame 261.

The second left vertical portion SL2 includes a left front guide portion 7L having a left front opening 71L through which the left hydraulic hoses 251L are passed. The left front opening 71L is formed in the left front guide portion 7L at a position closer to the swivel joint 25 than the left hose guide portion 5L.

The left front opening 71L opens in the front-rear direction of the vehicle above the center frame 26.

In the present embodiment, the left front opening 71L has a U-shape, and the inside of the U-shape forms an opening.

A right end opening 2721R is formed in a right frame end portion 272R of the right side frame 27R. The multiple right hydraulic hoses 251R are passed through the right end opening 2721R.

A left end opening 2721L is formed in a left frame end portion 272L of the left side frame 27L. The multiple left hydraulic hoses 251L are passed through the left end opening 2721L.

In the present embodiment, the opening centers of the right opening 51R and the right rear opening 61R are positioned at the same height from the center frame 26, and the opening center of the right front opening 71R is positioned higher than the opening centers of the right opening 51R and the right rear opening 61R.

The opening centers of the left opening 51L and the left rear opening 61L are positioned at the same height from the center frame 26, and the opening center of the left front opening 71L is positioned higher than the opening centers of the left opening 51L and the left rear opening 61L.

According to the above-described embodiments, when the vehicle width is the minimum vehicle width and the maximum vehicle width, the multiple left and right hydraulic hoses 251L and 251R are passed through at least the left and right hose guide portions 5L and 5R, so that the free movement of the left and right hydraulic hoses 251L and 251R can be restricted without forcibly bending the left and right hydraulic hoses 251L and 251R. The length of the hydraulic hoses when the vehicle width is the minimum vehicle width and the maximum vehicle width can be designed to be the minimum necessary length by passing the hydraulic hoses through the set hose path portions.

Other Embodiments

Although the present embodiments have been described with reference to the drawings, the specific configuration is not limited to the embodiments. The present embodiments are shown by the claims as well as the description of the embodiments described above, and includes all modifications within the meaning and scope equivalent to scope of the claims.

The center of each of the right opening, the right front opening, and the right rear opening may be at the same height position from the center frame or at a different height position. The openings closer to the right hydraulic motor may be positioned at lower the positions. The size of each opening may be the same or different.

The center of each of the left opening, the left front opening, and the left rear opening may be at the same height position from the center frame or at a different height position. The openings closer to the left hydraulic motor may be positioned at lower the positions. The size of each opening may be the same or different.

DESCRIPTION OF REFERENCE NUMERALS 1 backhoe
2 lower rotating body
21R right crawler
21L right crawler
22R right traveling motor
22L left traveling motor
23 blade
24 blade cylinder
25 swivel joint
251R right hydraulic hoses
251L left hydraulic hoses
26 center frame
261 rear lateral support frame
261R rear right coupling portion
261L rear left coupling portion 262 front lateral support frame
262R front right coupling portion
262L front left coupling portion
263 hydraulic cylinder for expansion and contraction
27R right side frame
27L left side frame
271R right vertical portion
271L left vertical portion
272R right frame end portion
2721R right end opening
272L left frame end portion
2721L left end opening
3R rear right restriction member
31R fixed end
32R rear right limiting portion
321R through-hole
33R stopper
3L rear left restriction member
31L fixed end
32L rear left limiting portion
321L through-hole
33L stopper
4R front right restriction member
4L front left restriction member
5R right hose guide portion
51R right opening
5L left hose guide portion
51L left opening
6R right rear guide portion
61R right rear opening
6L left rear guide portion
61L left rear opening
7R right front guide portion
71R right front opening
7L left front guide portion
71L left front opening
8 working machine
81 boom
81a boom cylinder
82 arm
82a arm cylinder
83 bucket
83a bucket cylinder
91 steering unit
92 engine
93 rotating base
94 rotation motor
SL left path space
SL1 first left vertical portion
SL2 second left vertical portion
SR right path space
SR1 first right vertical portion
SR2 second right vertical portion

The invention claimed is:

1. A working vehicle comprising:
an upper rotating body; and
a lower traveling body that rotatably supports the upper rotating body,
the lower traveling body including:
  a center frame on which a swivel joint is vertically disposed, one end of a right hydraulic hose and one end of a left hydraulic hose being connected to the swivel joint;
  a right side frame and a left side frame symmetrically disposed on sides of the center frame, a right traveling motor being mounted on the right side frame, the other end of the right hydraulic hose being connected to the right traveling motor, a left traveling motor being mounted on the left side frame, the other end of the left hydraulic hose being connected to the left traveling motor;
  at least one right restriction member and at least one left restriction member restricting a gap between the right side frame and the left side frame to be a maximum vehicle width, the right restriction member extending from the right side frame toward the left side frame and one end of the right restriction member, the left restriction member extending from the left side frame toward the right side frame and one end of the left restriction member;
  a right hose guide portion extending from the one end of the right restriction member towards the left side frame, the right hose guide portion having a right opening through which the right hydraulic hose is passed; and
  a left hose guide portion extending from the one end of the left restriction member towards the right side frame, the left hose guide portion having a left opening through which the left hydraulic hose is passed.

2. The working vehicle according to claim 1, wherein the lower traveling body further includes:
  a rear lateral support frame disposed on a rear upper surface of the center frame behind the swivel joint;
  a rear right coupling portion that extends from the right side frame toward the left side frame and is slidably inserted to a right side of the rear lateral support frame;
  a rear left coupling portion that faces the rear right coupling portion, extends from the left side frame toward the right side frame, and is slidably inserted to a left side of the rear lateral support frame;
  a front lateral support frame disposed on a front upper surface of the center frame such that the front lateral support frame faces the rear lateral support frame with the swivel joint in between;
  a front right coupling portion that extends from the right side frame toward the left side frame and is slidably inserted to a right side of the front lateral support frame; and
  a front left coupling portion that faces the front right coupling portion, extends from the left side frame toward the right side frame, and is slidably inserted to a left side of the front lateral support frame.

3. The working vehicle according to claim 2, wherein the lower traveling body further includes a hose path portion having a space on an upper face of the center frame, the space guiding the right and left hydraulic hoses from the swivel joint to the right and left traveling motors.

4. The working vehicle according to claim 3, wherein the hose path portion further includes a right rear guide portion and/or a left rear guide portion,
  the right rear guide portion having a right rear opening disposed closer to the right traveling motor than the right hose guide portion, the right hydraulic hose being passed through the right rear opening, and
  the left rear guide portion having a left rear opening closer to the left traveling motor than the left hose guide portion, the left hydraulic hose being passed through the left rear opening.

5. The working vehicle according to claim 3, wherein the hose path portion further includes a right front guide portion and/or a left front guide portion,
  the right front guide portion having a right front opening closer to the swivel joint than the right hose guide portion, the right hydraulic hose being passed through the right front opening, and the left front guide portion having a left front opening closer to the swivel joint than the left hose guide portion, the left hydraulic hose being passed through the left front opening.

6. The working vehicle according to claim 1, wherein the lower traveling body further includes a rear lateral support frame disposed on a rear upper surface of the center frame behind the swivel joint.

7. The working vehicle according to claim 6, wherein the lower traveling body further includes a front lateral support frame disposed on a front upper surface of the center frame such that the front lateral support frame faces the rear lateral support frame with the swivel joint in between.

8. The working vehicle according to claim 7, wherein the lower traveling body further includes:
a rear coupling portion that extends from one of the right side frame or the left side frame to the other of the right side frame or the left side frame and is slidably inserted to a side of the rear lateral support frame; or
a front coupling portion that extends from one of the right side frame or the left side frame to the other of the right side frame or the left side frame and is slidably inserted to a side of the front lateral support frame.

9. The working vehicle according to claim 3, wherein the hose path portion further includes a right rear guide portion, and
the right rear guide portion having a right rear opening disposed closer to the right traveling motor than the right hose guide portion, the right hydraulic hose being passed through the right rear opening.

10. The working vehicle according to claim 3, wherein the hose path portion further includes a right front guide portion, and
the right front guide portion having a right front opening closer to the swivel joint than the right hose guide portion, the right hydraulic hose being passed through the right front opening.

11. The working vehicle according to claim 1, wherein the at least one right restriction member includes a right rod, wherein a first end of the right rod extends from the right side frame, and
the at least one left restriction member includes a left rod, wherein a first end of the left rod extends from the left side frame.

12. The working vehicle according to claim 11, wherein a second end of the right rod is coupled to a right stop member, and
a second end of the left rod is coupled to a left stop member.

13. The working vehicle according to claim 12, wherein when the gap between the right side frame and the left side frame is at maximum vehicle width, the right stop member abuts a right limiting portion and the left stop member abuts a left limiting portion.

14. A working vehicle comprising:
a hydraulic hose;
an upper rotating body; and
a lower traveling body that rotatably supports the upper rotating body, the lower traveling body including:
a frame on which a swivel joint is vertically disposed, wherein a first end of the hydraulic hose is connected to the swivel joint;
a side frame disposed on a side of the frame, wherein a first traveling motor is mounted on the side frame, and wherein a second end of the hydraulic hose is connected to the first traveling motor;
a restriction member configured to prevent a width between the side frame and the frame from exceeding a maximum width, the restriction member extending from the side frame and toward one end of the restriction member; and
a hose guide portion extending from the one end of the restriction member and away from the side frame, wherein the hose guide portion defines an opening through which the hydraulic hose extends.

15. The working vehicle according to claim 14, wherein the hose guide portion and the restriction member extend in the same direction.

16. The working vehicle according to claim 14, wherein the restriction member includes a rod, and
a first end of the rod extends from the side frame.

17. The working vehicle according to claim 16, wherein a second end of the rod is coupled to a stop member.

18. The working vehicle according to claim 17, wherein, when a width between the side frame and the frame is at a maximum width, the stop member abuts a limiting portion.

19. The working vehicle according to claim 18, wherein the limiting portion extends from a lateral support frame connected to the frame.

* * * * *